(12) United States Patent
Gilra

(10) Patent No.: US 7,701,464 B1
(45) Date of Patent: Apr. 20, 2010

(54) GROUP COLOR MIXER AND COLOR ORGANIZER

(75) Inventor: Anant Gilra, Karnataka (IN)

(73) Assignee: Adobe Systems, Incorporated, San Jose, CA (US)

( * ) Notice: Subject to any disclaimer, the term of this patent is extended or adjusted under 35 U.S.C. 154(b) by 504 days.

(21) Appl. No.: 11/683,427

(22) Filed: Mar. 7, 2007

(51) Int. Cl.
G09G 5/02 (2006.01)

(52) U.S. Cl. ............... 345/594; 715/810; 715/834; 715/835

(58) Field of Classification Search ......... 345/594; 715/834
See application file for complete search history.

(56) References Cited

U.S. PATENT DOCUMENTS

| | | | |
|---|---|---|---|
| 5,335,095 A | 8/1994 | Kageyama et al. | |
| 5,434,683 A | 7/1995 | Sekine et al. | |
| 5,461,493 A | 10/1995 | Venable | |
| 6,088,030 A * | 7/2000 | Bertram et al. | 715/839 |
| 6,721,769 B1 * | 4/2004 | Rappaport et al. | 707/205 |

OTHER PUBLICATIONS

Health Services Library, University of North Carolina at Chapel Hill, "Introduction to Photoshop," 2005. http://www.hsl.unc.edu/Services/Tutorials/Photoshop/index.htm.*
Scott Kelby and Terry White, InDesign(R) CS/CS2 Killer Tips, 2005, New Riders, pp. 63, 128.*
Kevin Hughes, "Color Picker," Oct. 2004. http://www.kevcom.com/colorpicker/documentation/index.html.*
Giovanni Moretti and Paul Lyons, "Controlling the Complexity of Grouped Items in Colour Interfaces," 2005, Proceedings of the 6th ACM SIGCHI New Zealand chapter's international conference on Computer-human interaction: making CHI natural (CHINZ), vol. 94, pp. 19-23.*
Sessions.edu, Graphic Design Portfolio-Builder: Adobe Photoshop and Adobe Illustrator Projects, 2005, Peachpit Press.*
Gorky, "Drag, Drop and Swap," 2000. http://www.flashkit.com/tutorials/Actionscripting/Drag_Dr-Gorky-126/index.php.*
Andy Anderson and Steve Johnson, Show Me Adobe(R) Photoshop(R) CS, 2003.*

* cited by examiner

*Primary Examiner*—Xiao M Wu
*Assistant Examiner*—Lillian K Ng
(74) *Attorney, Agent, or Firm*—Robert C. Kowert; Meyertons, Hood, Kivlin, Kowert & Goetzel, P.C.

(57) ABSTRACT

A computer implemented image editing tool and method for using the tool for color-selective editing of a digital image including multiple shapes with different color fills displayed on a display. The image editing tool includes a modified group color mixer which has a plurality of markers representing the colors of the plurality of shapes in the digital image. By dragging the markers, multiple shapes can be edited with the same group color mixer. The image editing tool also includes a color organizer which has swatches corresponding to the number of shapes and the color fills of shapes in the digital image. The swatches are positioned according to the positions of the corresponding shapes in the digital image for easy identification. Users can drag and drop swatches to swap colors between shapes, add new colors, discard colors, store colors for reference, edit multiple swatches simultaneously, and organize colors.

20 Claims, 11 Drawing Sheets

GROUP COLOR MIXER AND COLOR ORGANIZER

BACKGROUND

1. Technical Field

Embodiments of the present invention relate generally to image editing and more specifically to color-selective editing of digital images.

2. Discussion of Prior Art

The rapid development and increasing popularity of infrastructures such as the Internet, storages and computers for transmission, storage and processing of images, has made it more convenient to handle images as electronic documents. Digital images allow easy editing facilities and users can try various editing functions such as color combinations, different shapes, contrast, brightness, saturation and hue, etc. In existing color editing tools, a color mixer or a color palette provides the functionality for trying different color combinations on a display. The color mixer shows the color of the selected shape in the digital image by a marker. If there are a number of shapes in the digital image, the color of each shape has to be identified separately in the color mixer for color editing purposes, which is tedious for the user.

With existing color editing tools, a user selects a shape having a color fill in a digital image, opens the color mixer and changes the color. For another shape in the digital image, the user selects that other shape and repeats the process. If the user wants to change the color of a group of shapes he/she has to select and change the color of each shape individually. For example, a digital image may include four shapes (Si) each having a Color fill (Ci). Initially Ci is mapped to Si. But since location, size and relative placements of shapes having color fills can make a significant difference, a designer may want C1 to go to S3, C2 to go to S4, C3 to be discarded and a new color and C4 to be kept for reference. Also, he/she needs two new colors C5 and C6 to fill the shapes S1 and S2, and try new colors in the group. Currently there are no convenient ways of swapping colors of two different shapes having two different color fills. One has to manually select the color. Also, retaining colors for future references (the colors which one might use but is not sure) is not possible. The previous color selection will be lost if the color is changed. For effective color editing, the user must select, remember and manipulate a group of colors, swap colors and view different combinations to finalize the color.

Hence, there is a need for an improved system and method for selecting and reorganizing colors in a digital image.

SUMMARY

Embodiments of the invention teach a computer implemented image editing tool and a method of using the tool for color-selective editing of a digital image having a plurality of shapes with different color fills.

A digital image on a display can be color-selectively edited by an example method that, in a group color mixer, generates markers representing the colors of shapes in the digital image. The method, in a color organizer, creates a grid comprising swatches corresponding to the number, the colors, and the positions of corresponding shapes in the digital image. The group color mixer and color organizer can perform various editing functionalities. In the group color mixer the markers can be dragged to edit multiple shapes. With the color organizer, users can drag and drop swatches to swap colors between shapes, add new color, discard color, store color for reference, edit multiple swatches simultaneously, and organize colors.

An example image editing tool provides color-selective editing of a digital image on a display. The image editing tool includes a group color mixer having a plurality of markers representing the colors of the plurality of shapes in the digital image; a color organizer for creating a grid comprising a plurality of swatches representing the colors and positions of the shapes; a plug-in module for providing an interface with a color selection tool and the image editing tool; and a synchronization module for synchronizing the operations between the group color mixer and color organizer.

The group color mixer has a marker generation module for generating the markers and for maintaining a map between the shapes and the markers.

The color organizer includes a swatches grid module for creating the grid comprising the plurality of swatches, and for creating an inner area of the grid and outer area of the grid; a layout manager module for positioning the swatches corresponding to the positions of the shapes in the digital image; and a drag-and-drop manager module for managing the drag and drop functions of swatches between the inner and outer areas of the grid.

The image editing tool also includes a tab navigation module for switching the views between the group color mixer and the color organizer; a database module for storing the colors selected while editing and for maintaining the positions of the swatches in the color organizer; and an event management module for managing a set of input instructions between the image editing tool and input devices coupled to the image editing tool.

Another example image editing tool enables color-selective editing of a digital image on a display. The image editing tool includes a group color mixer with a plurality of markers; and a color pie with a plurality of color slices representing the colors of the shapes in the digital image, where modification of one such color slice affects the color of the corresponding shape in the digital image. Users can add, remove, or swap colors, and add reference colors, by dragging color slices inside and between the boundaries of the color pie.

An example computer program product, encoded on a computer-readable medium, operable to cause data processing apparatus to perform operations provides color-selective editing of a digital image on a display. The computer program generates markers in a group color mixer which represent the colors of shapes in the digital image; creates a grid comprising swatches corresponding to the number and colors of shapes in the digital image, and positioned according to the positions of the corresponding shapes in a color organizer; and uses the group color mixer and color organizer to perform a set of edit functions. By dragging the markers, multiple shapes can be edited with the same group color mixer. Users can drag and drop swatches to swap colors between shapes, add new color, discard color, store color for reference, save reference colors, edit multiple swatches simultaneously, and organize colors with the color organizer.

Other aspects and example embodiments are provided in the Figures and the Detailed Description that follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EMBODIMENTS

Embodiments of the invention teach a computer implemented image editing tool and method for color-selective editing of a digital image 10 (FIG. 4) having multiple shapes with different color fills. The image editing tool includes a group color mixer 300 (FIG. 3) and a color organizer 400 (FIG. 4). The group color mixer 300, which may be built on an existing color mixer by adding the capability of multiple selections and draggable markers, enables users to select and edit the color(s) of a shape or group of shapes simultaneously. The color organizer 400 provides editing functions such as swapping colors, adding colors, discarding colors, storing colors for reference and retrieving reference colors to the shapes of the digital image.

Figure 1:
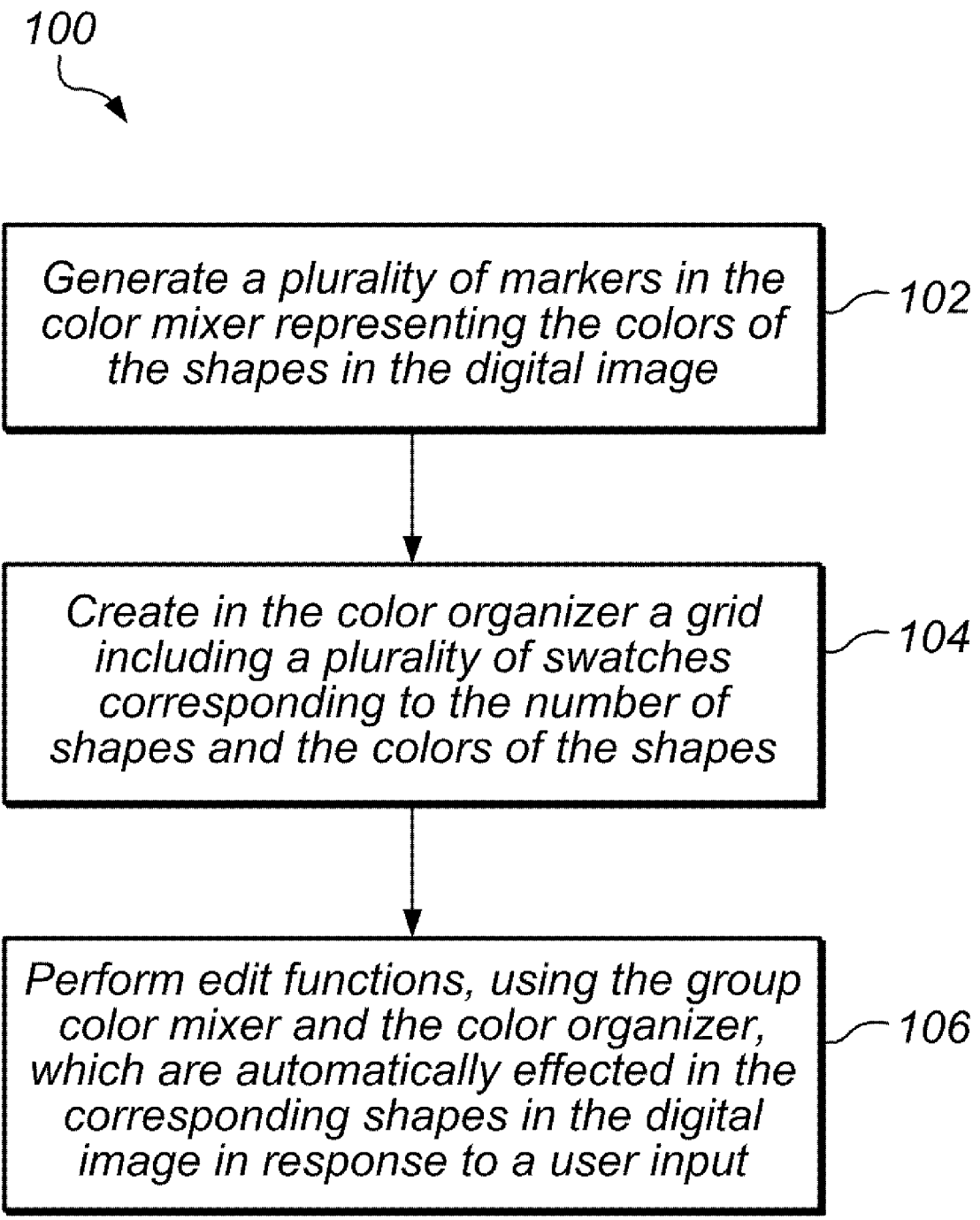
FIG. 1 is a flow diagram illustrating steps in a method for providing color-selective editing of a digital image in one embodiment of the invention.

FIG. 1 is a flow diagram illustrating steps in a method 100 for editing colors of a digital image 10 (FIG. 4) in one embodiment of the invention. Step 102 generates in the group color mixer 300 (FIG. 3) a plurality of markers 302 which represent the colors of the shapes 1-6 in the digital image. The group color mixer includes a marker for each shape in the digital image. The marker 302 for an individual shape is bounded by a line of a contrasting color or black or white. Adding a new shape to the digital image 10 adds a new marker 302 at the appropriate hue point in the group color mixer.

Step 104 creates, in a color organizer 400 (FIG. 4), a grid 401 including a plurality of swatches corresponding to the number and colors of their respective shapes in the digital image 10. The swatches are positioned according to the positions of the corresponding shapes in the digital image.

Figure 3:
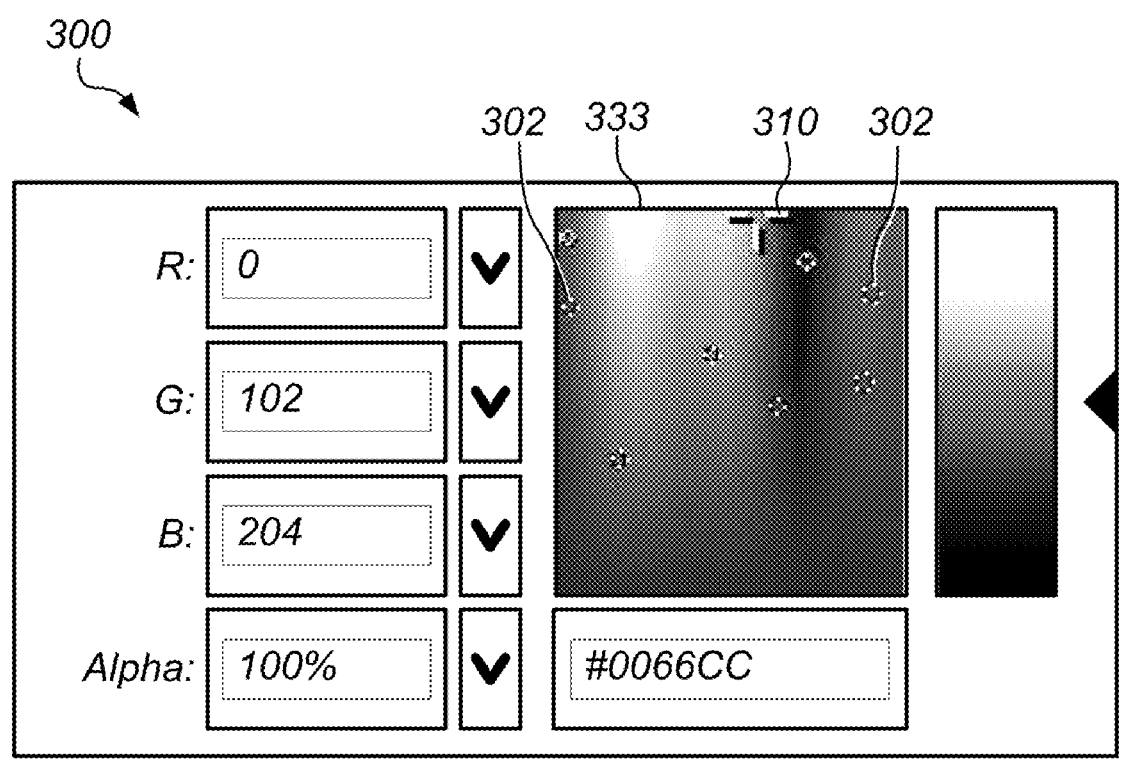
FIG. 3 is a screen shot view of the group color mixer in one embodiment of the invention.
Figure 4:
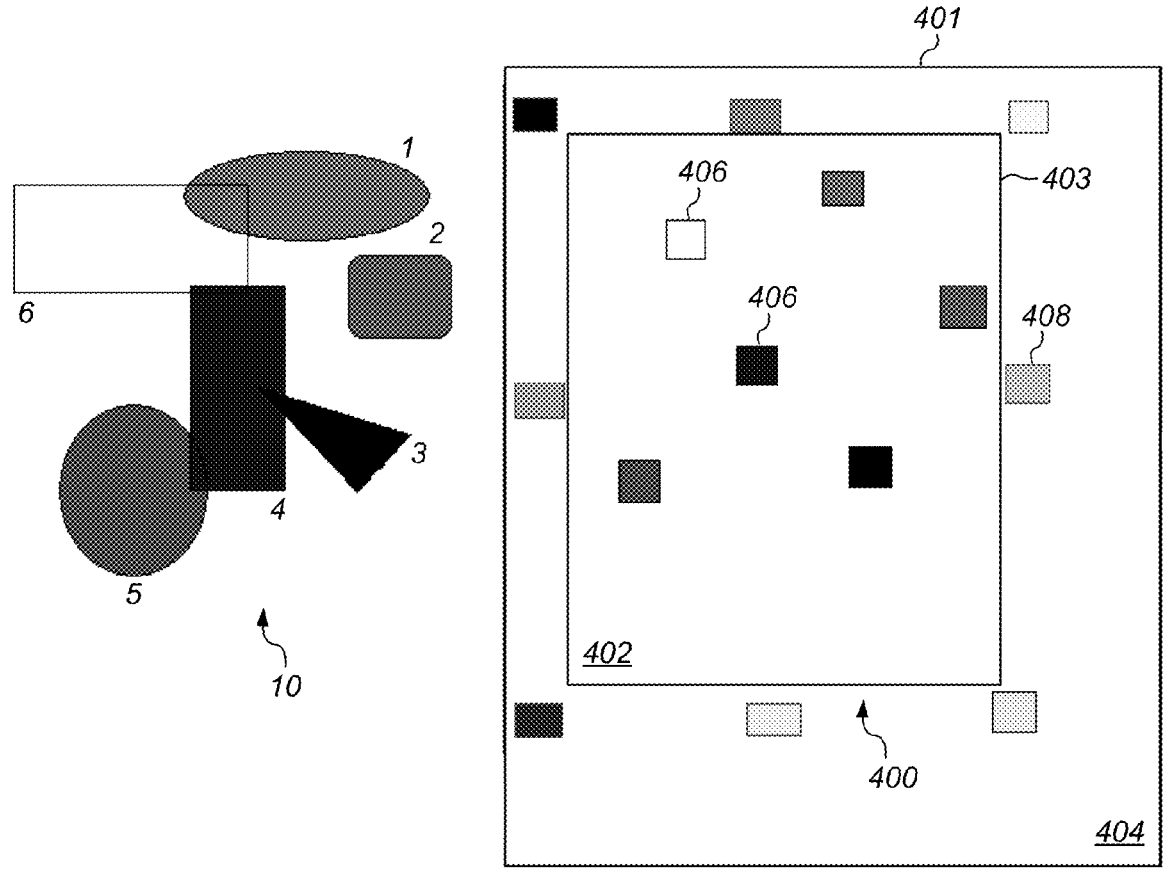
FIG. 4 is a screen shot of a digital image containing color filled shapes and of a color organizer in one embodiment of the invention.

Step 106 performs a set of edit functions using the FIG. 3 group color mixer 300 and the FIG. 4 color organizer 400 in response to user input. Modifications made by the group color mixer or by the color organizer automatically affect the subject shapes in the digital image 10.

Figure 2:
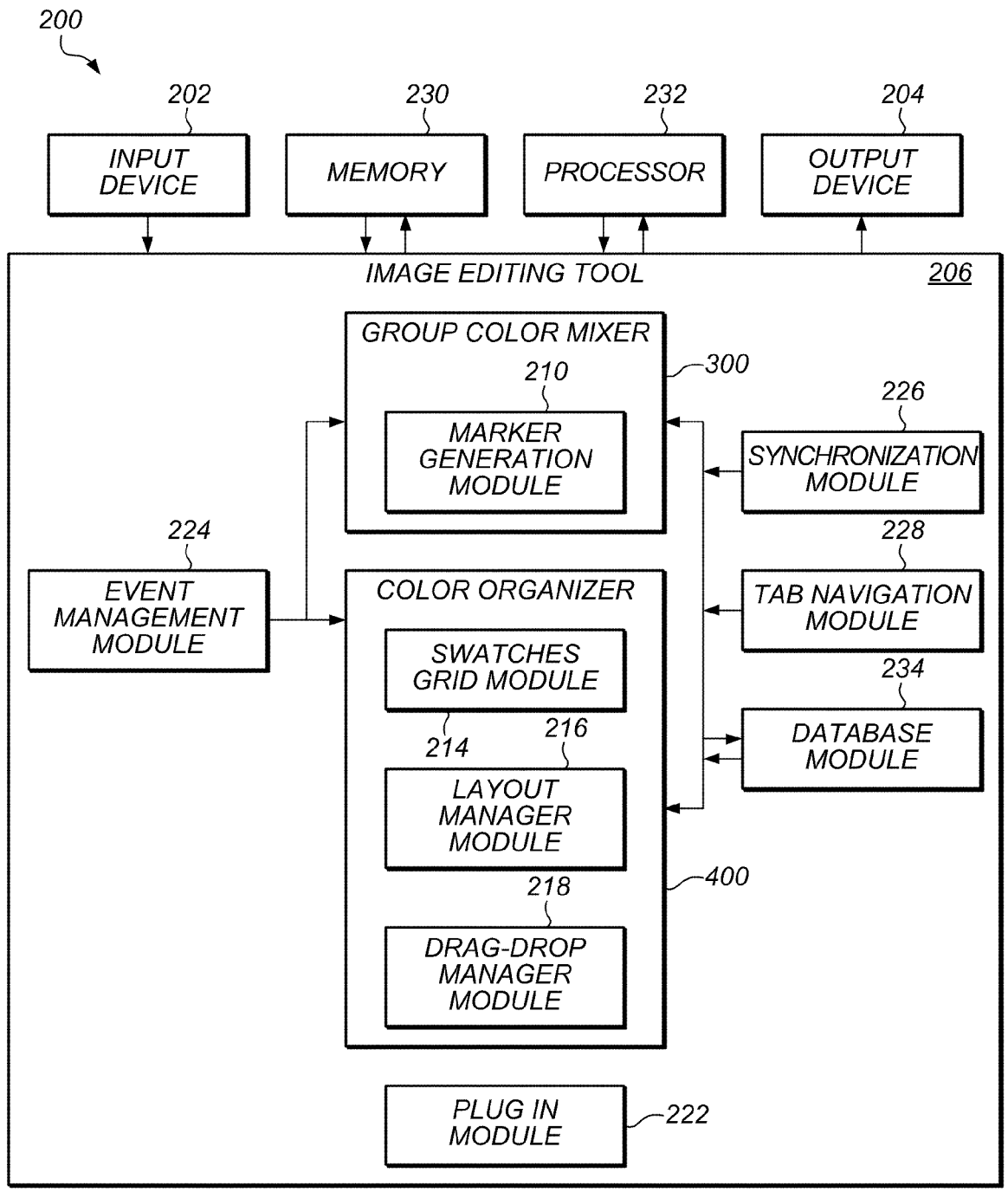
FIG. 2 is a block diagram of a computer system according to an embodiment of the invention for providing color-selective editing of a digital image using the image editing tool.

FIG. 2 is a block diagram illustrating an embodiment of a computer system 200 for implementing the image editing tool for color-selective editing of a digital image. The computer system 200 includes an input device 202, an output device 204, memory 230, a processor 232, and the image editing tool 206. The input device 202 is a user interface means for receiving and transferring a user's manipulation command to the processor 232, and is generally implemented by a keyboard, a mouse, a keypad, and the like. The output device 204 displays specified information and is generally implemented by a Liquid Crystal Display (LCD) or comparable monitor.

In one embodiment, the image editing tool 206 includes a group color mixer 300, a color organizer 400, a plug in module 222, an event management module 224, a synchronization module 226, a tab navigation module 228, and a database module 234. The group color mixer 300 in turn includes a marker generation module 210 for generating the plurality of markers. The marker generation module 210 also maintains a map relating the shapes to the markers in the group color mixer 300. Placing the cursor over markers highlights the corresponding shapes. This functionality is handled by the marker generation module 210. The marker generation module 210 also handles coloring of the markers. The color of the marker would be either the color of the border of the associated shape, or black or white. As one moves the marker, it uses one of the aforementioned colors (border color of the associated shape is given the highest preference followed by black color and white color), only if the marker is not clearly visible.

The color organizer 400 includes a swatches grid module 214 for creating the (FIG. 4) grid 401 comprising a boundary 403, an inner area 402 and an outer area 404, and the plurality of swatches, a layout manager module 216 for positioning the swatches in positions corresponding to the positions of shapes of the digital image, and a drag drop manager module 218 for managing the drag and drop functions of swatches between the inner and outer areas of the grid.

The plug-in module 222 provides an interface with a color selection tool and the image editing tool 206. The event management module 224 manages the input instructions between the image editing tool 206 and the input device 202 coupled to the image editing tool 206. The synchronization module 226 synchronizes the operations between the group color mixer 300 and color organizer 400. The tab navigation module 228 is included in the image editing tool 206 for switching the views between the group color mixer 300 and the color organizer 400 on the display. The data base module 234 stores the colors selected in editing and maintains the position of the swatches in the color organizer 400.

FIG. 3 is a screen shot view of a group color mixer 300 for selecting colors in one embodiment of the invention. Markers 302 can be of any closed loop shapes including for example rectangular, triangular, or in this FIG., circular. A FIG. 4 example digital image 10 includes six shapes 1-6 with different color fills. The group color mixer 300 highlights the six colors with small circles 302 around them. There will be a circle 302, highlighting the fill color for each shape 1-6 in the digital image. Placing the cursor 310 over any of these circles highlights the color and corresponding shape.

The group color mixer 300 can be used to select a group of shapes whose colors are to be edited. The circles 302 are draggable across palette 333, thus advantageously allowing a user to change colors of multiple shapes simultaneously. Conventionally, a user has to select and change the color of each shape individually. For example, if there are 50 shapes with the same color (say 50 yellow tiles in a kitchen design), the group color mixer will represent them as a single marker. By dragging this group marker, the user can change the color of all 50 shapes at once. Shapes with similar colors are clubbed together and represented by a single marker in the group color mixer 300 by default. Pressing a special key (say, the F1 key), can ungroup them and drag them around individually, for example, if there are three shapes having a red color fill, but one wants to change only one shape's color. This functionality can be also used in the color organizer 400 for such purposes. Since there is a one-to-one mapping between shapes and swatches, the user can easily select or swap one of the three shapes with a new color, which would automatically ungroup this shape from the group of three shapes.

FIG. 4 is a view of the color organizer 400 for handling selected colors in one embodiment of the invention. The color organizer 400 forms a grid 401 having a boundary 403 defining an inner area 402 and an outer area 404. In the inner area 402 (for example rectangular) swatches 406 filled with the colors of corresponding shapes, in positions corresponding to the positions of the mid points of the respective shapes, in the digital image 10.

FIG. 4 shows six inner swatches 406 representing the colors of six corresponding shapes 1-6 in the digital image 10. The color organizer's outer area 404 is reserved for reference swatches 408 which can be selected at the user's discretion. For example a user can reserve the top and side lines for reference colors and the bottom line for favorite colors. The top and side reference colors are automatically saved so that they can be used in editing other digital images 10. Therefore, whenever a new digital image 10 is launched for editing, the top and side reference colors will be same as the those for the last saved digital image file, so that the user can use his/her favorite colors. The bottom line could be used for adding new colors. The top/side line colors can be changed, discarded or swapped.

In one embodiment of the invention, the color organizer 400 has various editing functionalities as follows. Users can add a new color to a swatch by dragging a color from the outer area 404 to the inner area 402. For swapping colors between two inner area swatches 406, the inner area swatches 406 are interchanged by dragging one swatch to the other. Users can also select multiple inner area swatches 406 and edit their colors simultaneously by dragging an inner area swatch 406 to the outer area 404, which discards the inner area swatch 406 color from the corresponding shape in the image and leaves it transparent. The color of the inner area swatch 406 dragged out is kept for reference. Dragging any reference swatches 408 back to the inner area 402 swaps the reference swatches 408 with the corresponding shapes.

The inner area 402, boundary 403 and outer area 404 contents are aligned in a grid. The width and height of each grid item (swatch) changes according to the number of shapes/colors in the digital image 10. Dragging a color into the inner area 402 colors the grid item (swatch) closest to the cursor, thus allowing the user to position the swatch at a position of his/her choice. Also, dragging an inner swatch 406 between the inner and outer areas 402 and 404 of the grid places the swatch in the closest grid position. This allows the user to control the position of the reference swatches 408.

Figure 5:
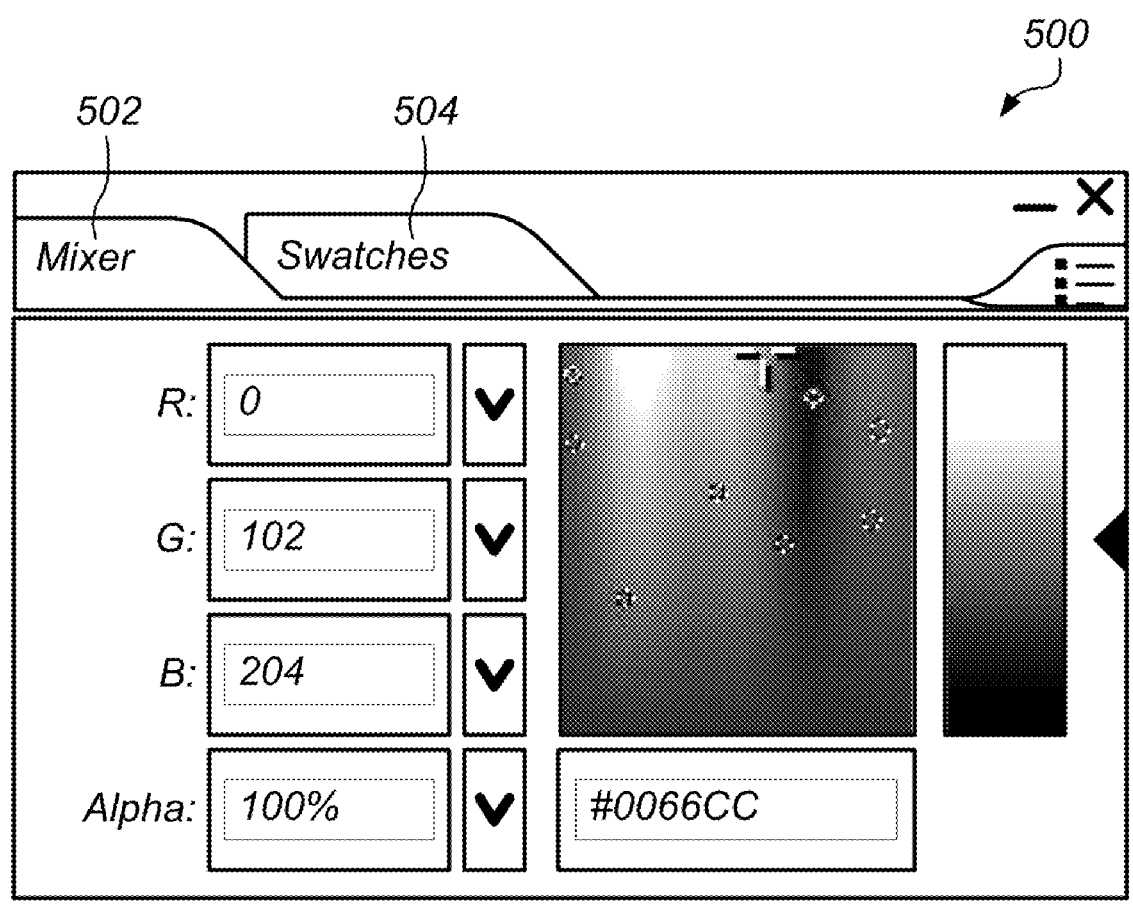
FIG. 5 is a screen shot illustrating the two tabs of the Graphical User Interface (GUI) in one embodiment of the invention.

FIG. 5 is a screen shot illustrating the two tabs of the Graphical User Interface (GUI) 500 in one embodiment of the invention. The first tab 502 is for the group color mixer 300 and the second tab 504 (labeled "swatches") is for the color organizer 400. Users can switch between the two tabs 502, 504 to edit colors making use of the functionalities of group color mixer 300 and color organizer 400. The modifications made in the group color mixer and color organizer automatically change the colors of shapes in the digital image 10.

FIG. 6-FIG. 11 are diagrams illustrating a color pie view of the color organizer according to an alternate embodiment of the invention. The color organizer grid and color pie embodiments are preferred, but different embodiments which have a one-to-one mapping with shapes can be used instead. In each of FIG. 6-FIG. 11 the left side shows the digital image 600 with six shapes with different color fills numbered from 1 to 6. The right side shows the color pie 602 including six color slices (numbered from 1 to 6, hereinafter C1, C2, C3, C4, C5, and C6 corresponding to the numbers in the digital image 600) selected in clockwise order. FIG. 7-FIG. 11 illustrate different editing functionalities available to the user.

Figure 6:
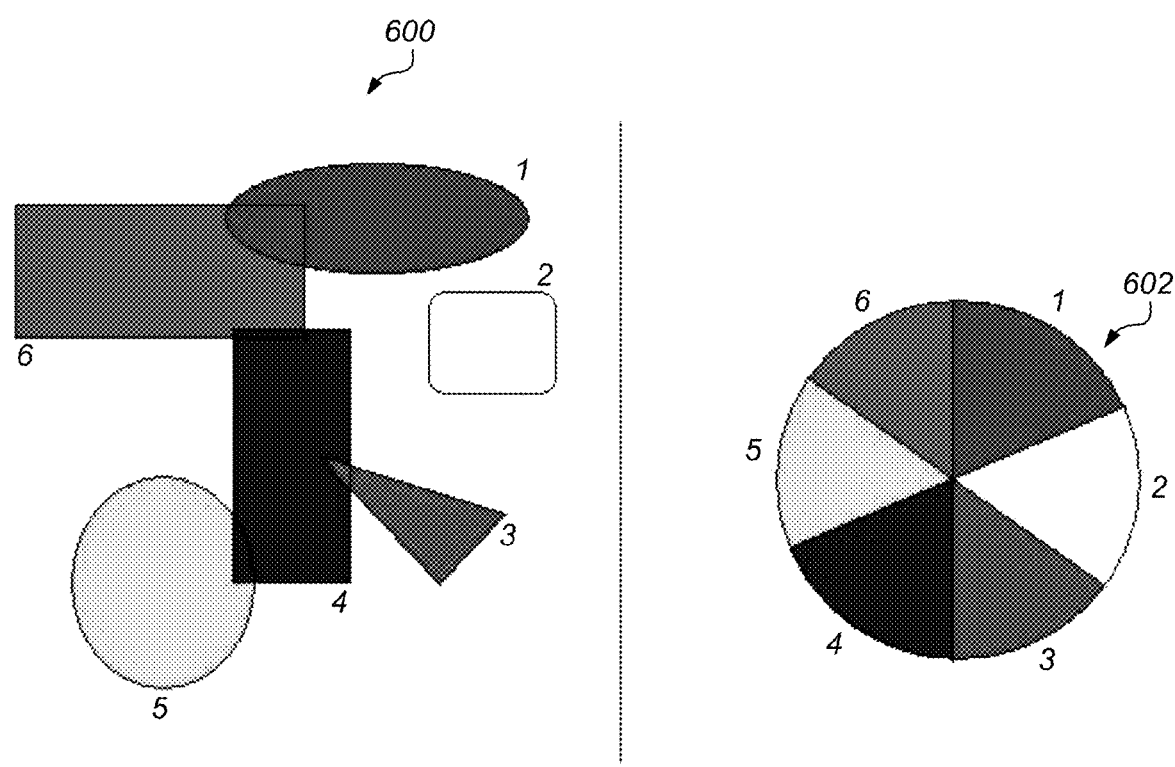
FIG. 6-FIG. 11 are diagrams illustrating views of a color pie-color organizer in an alternate embodiment of the invention.
Figure 7:
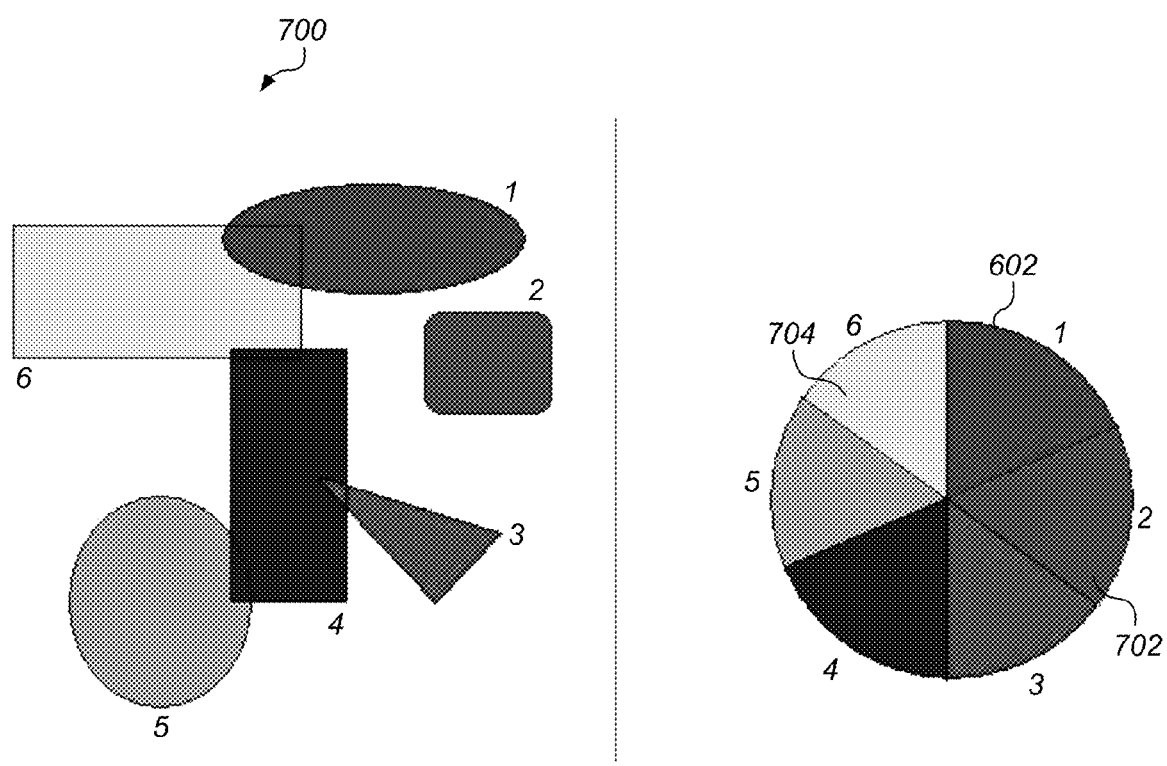
Figure 8:
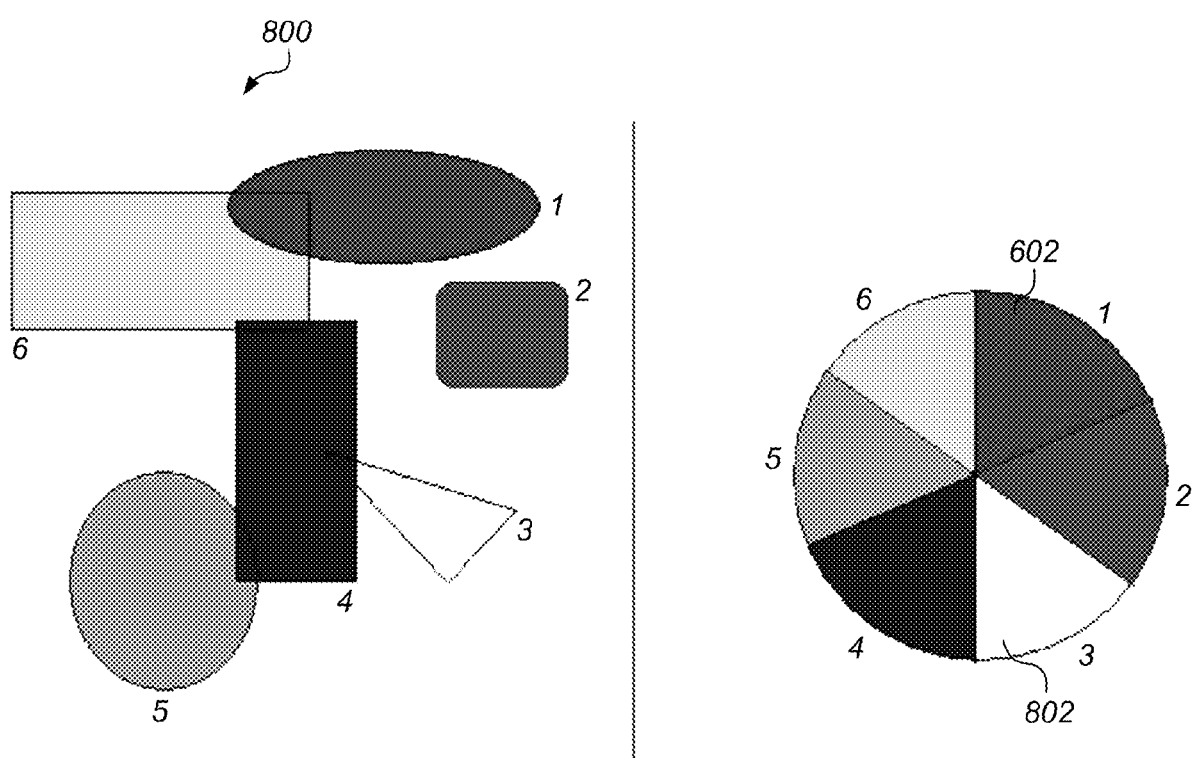
Figure 9:
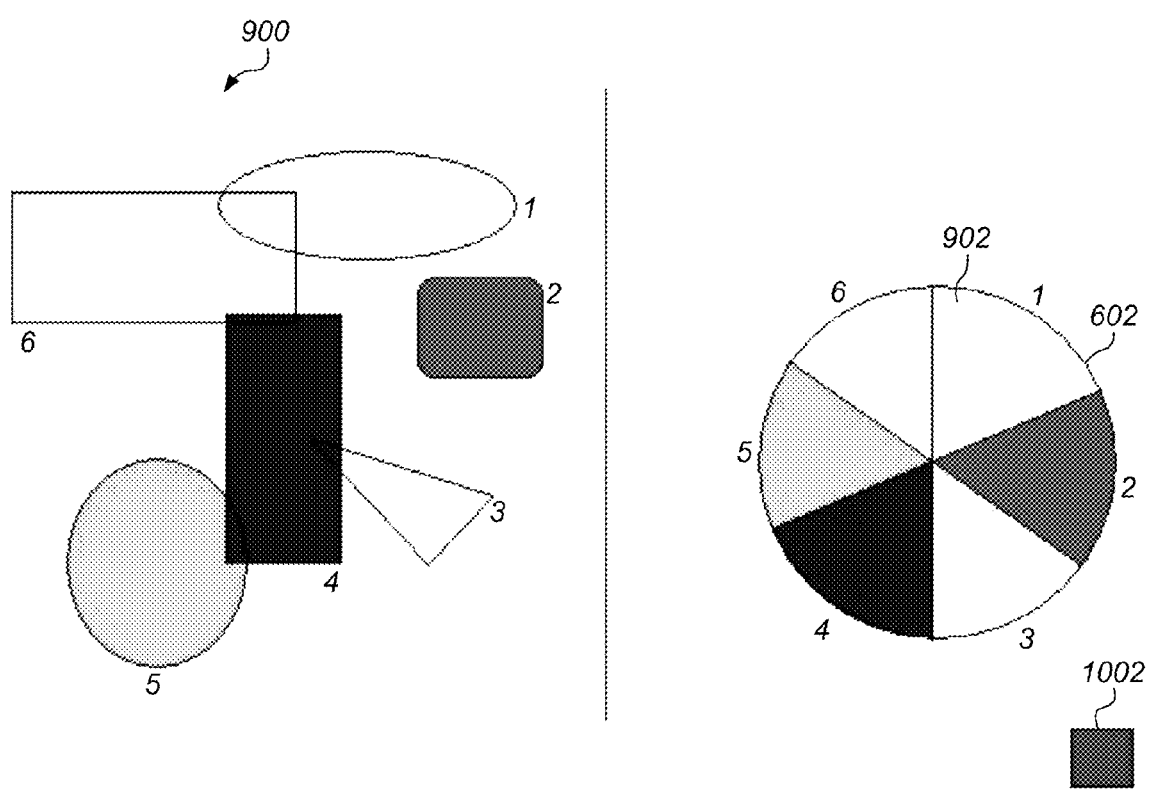

Referring now to FIG. 7, dragging color slice C2, 702 into the color slice C6, 704 or vice versa swaps the FIG. 6 colors between them. As shown in FIG. 8, dragging the color slice C3, 802 anywhere out of the color pie 602, but inside the color pie boundary (1104 in FIG. 11) will keep the color of C3 as a reference color slice 1002 as shown in FIG. 9.

Figure 10:
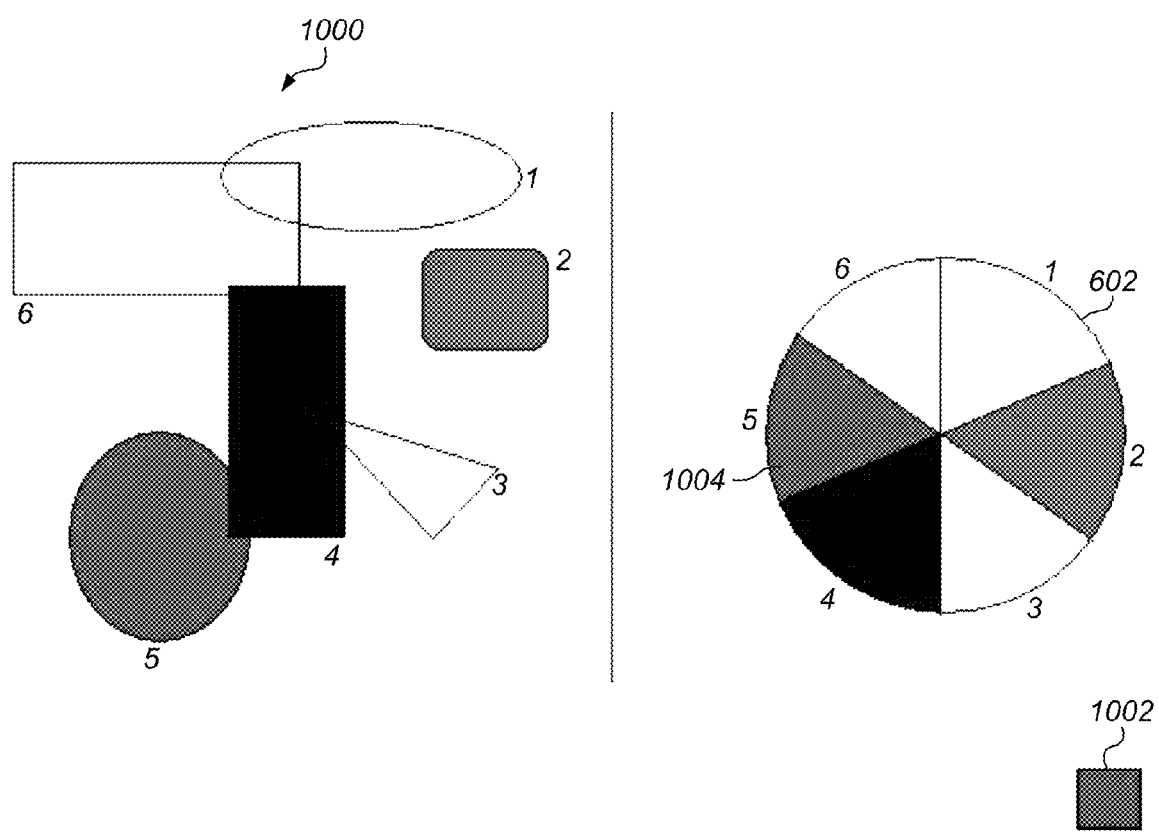
Figure 11:
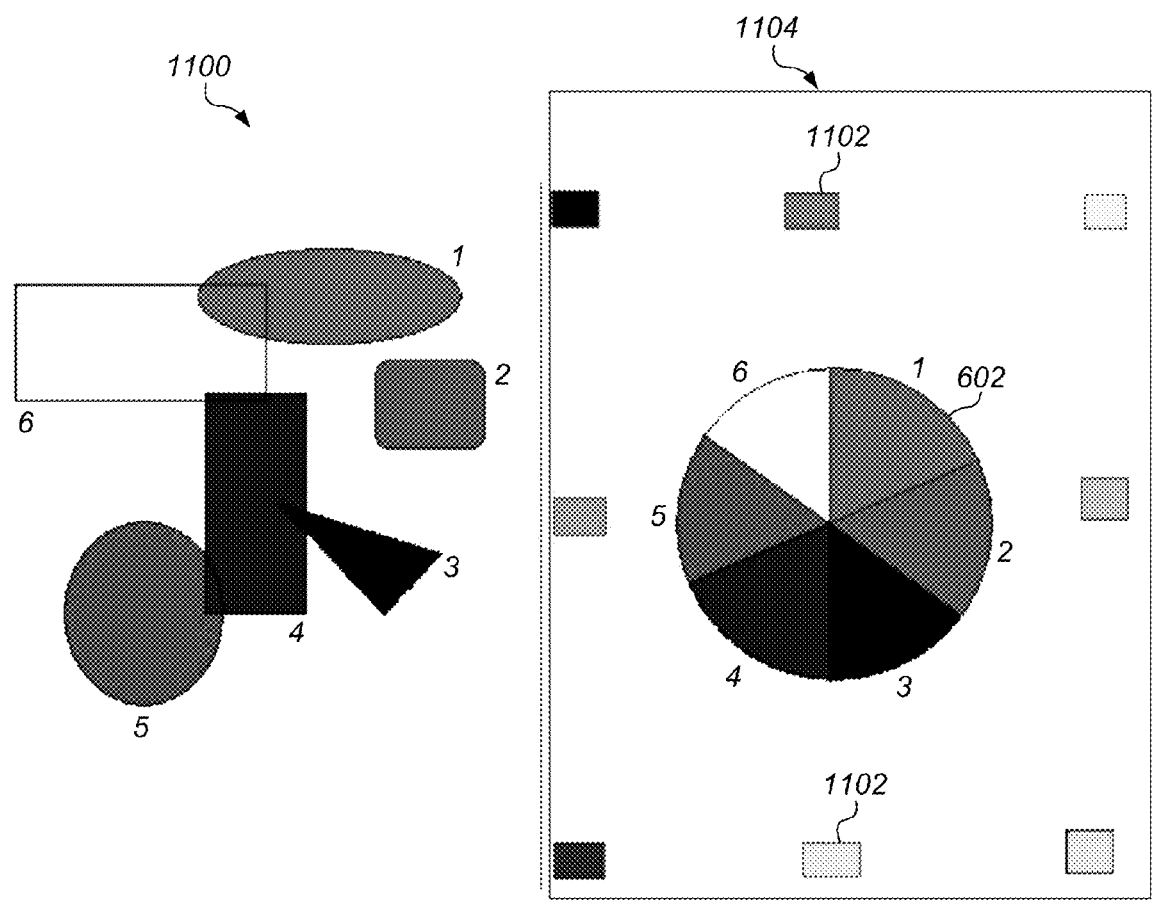

Dragging any color slice out of the color pie boundary (1104 in FIG. 11) discards it. As shown in FIG. 9, 900 dragging C1, 902 out of the component boundary discards the color of C1, 902. When a color is discarded, the color of the discarded color slice (here C1, 902) is changed to a transparent fill. As illustrated in FIG. 10, 1000 dragging a reference swatch 1002 into C5, 1004 swaps the color between the reference swatch and C5, 1002 and 1004. If the reference swatch 1002 is dragged into a no fill, the color of the reference swatch 1002 fills the pie slice and corresponding shape. FIG. 11 shows the edited digital image 1100 by filling up the remaining shapes in the digital image with other colors of choice selected from the group color mixer, or from any of the reference swatches 1102. More reference swatches can be added by clicking an "add reference swatch" check box (not shown in the figure). When a new reference swatch 1102 is added, it will contain one of the web-safe palette colors by default. Also, there is another check box provided for converting existing colors into the closest web-safe palette colors.

Embodiments of the invention may be applied in any of pixel based applications, vector applications, or mixed content applications. Additionally, the embodiments of the invention can be used as an add-on to existing image editing applications which use color-selective editing including Adobe® Photoshop®, Corel Draw ®, Adobe® Illustrator®, Adobe® Fireworks®, and Adobe® Flash®.

The forgoing description sets forth numerous specific details to convey a thorough understanding of the invention. However, it will be apparent to one skilled in the art that the embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A method, comprising:

performing by a computer:

providing a group color mixer interface for selecting colors for each of a plurality of shapes in a digital image, wherein the group color mixer interface comprises a plurality of markers, wherein each marker corresponds to one or more of the plurality of shapes so that each shape corresponds to a different one of the plurality of markers, and wherein each marker is adjustable over a color palette independently from other markers to select a color for its one of more corresponding shapes;

providing a color organizer interface comprising a plurality of color element positions, wherein the plurality of color element positions comprises a set of positions each corresponding to a different one of the plurality of shapes in said digital image, wherein at least some of the plurality of color element positions are populated with a color element, wherein each color element is moveable to one of the color element positions of the set to change the color of the corresponding shape; and receiving input to the group color mixer interface and the color organizer interface, and updating the color of one or more of the shapes in the digital image in response to said input;

wherein the color mixer interface and the color organizer interface are distinct from the digital image.

2. The method of claim 1, wherein said receiving input comprises receiving input to drag one of the markers to a different color in the group color mixer interface to change the color of the one or more shapes corresponding to the marker;

wherein two or more of the shapes are grouped to correspond to the same marker in the group color mixer interface, and wherein said receiving input further comprises receiving input to drag the same marker to a different color in the group color mixer interface to select the color of the two or more shapes simultaneously; and wherein said receiving input comprises: receiving input ungrouping one of the markers that corresponds to two or more shapes into two or more markers so that each of the two or more markers corresponds to an individual shape, and receiving input adjusting at least one of the two or more markers to select a color of an individual shape.

3. The method of claim 1, wherein the set of color element positions are in a first region of the color organizer interface and ones of the color element positions not in the set of positions are in a second region of the color organizer interface, wherein the color element positions in the second region do not correspond to any of the shapes;

wherein said receiving input comprises receiving input dragging a color element from a color element position in the second region to an unpopulated color element position in the first region to set a color for the shape corresponding to the color element position in the first region;

wherein said receiving input comprises receiving input dragging a color element from a color element position in the second region to a populated color element position in the first region, and swapping the color elements between the positions; and wherein said receiving input comprises receiving input dragging a color element from a color element position in the first region to an unpopulated color element position in the second region thereby unpopulating color element position in the first region.

4. The method of claim 1, wherein the plurality of markers each has a boundary line contrasting with the background color in the color palette.

5. The method of claim 1, wherein a shape in the digital image is highlighted in response to an input which moves a cursor in the group color mixer interface onto one of the markers that corresponds to the shape.

6. The method of claim 1, wherein the shapes of the color elements include close looped shapes including rectangular, circular, or triangular.

7. A computer readable medium including code executable by a processor to implement an image editing tool comprising:

a group color mixer interface for selecting colors for each of a plurality of shapes in a digital image, wherein the group color mixer interface comprises a plurality of markers, wherein each marker corresponds to one or more of the plurality of shapes so that each shape corresponds to a different one of the plurality of markers, and wherein each marker is adjustable over a color palette independently from other markers to select a color for its one or more corresponding shapes, and including a marker generation module for generating the plurality of markers and for maintaining a map between the plurality of shapes and the plurality of markers;

a color organizer interface comprising a plurality of color element positions, wherein the plurality of color element positions comprises a set of positions each corresponding to a different one of the plurality of shapes in the digital image, wherein at least some of the plurality of color element positions are populated with a color element, wherein each color element is moveable to one of the color element positions of the set to change the color of the corresponding shape;

a synchronization module for synchronizing operations between said group color mixer interface and said color organizer interface, wherein said synchronization module is configured to reflect changes to the color elements in the set of color element positions in the color organizer to the position of the markers in the color mixer interface, and reflect changes to the markers in the color mixer interface to the color of the color elements in the set of color element positions in the color organizer interface.

8. The computer readable medium of claim 7, the image editing tool further comprising:

a tab navigation module for switching between views of the group color mixer interface and of the color organizer interface;

a data base module for storing the colors selected and the positions of the color elements while editing in the color organizer interface; and an event management module for managing a set of input instructions between the image editing tool and input devices which may be coupled to the image editing tool.

9. The computer readable medium of claim 7, wherein the set of color element positions are in a first region of the color organizer interface and ones of the color element positions not in the set of positions are in a second region of the color organizer interface, wherein the color element positions in the second region do not correspond to any of the shapes, and wherein the image editing tool is configured to:

receiving input dragging one of the markers to a different color in the group color mixer interface to change the color of one or more shapes corresponding to the marker;

receive input dragging a color element from a color element position in the second region to an unpopulated color element position in the first region set to a color for the shape corresponding to the color element position in the first region;

receive input dragging a color element from a color element position in the second region to a populated color element position in the first region, and swapping the color elements between the positions; and receive input dragging a color element from a color element position in the first region to an unpopulated color element position in the second region thereby unpopulating color element position in the first region.

10. The computer readable medium of claim 7, wherein changes made in the group color mixer interface and in the color organizer interface automatically change the colors of the corresponding shapes in the digital image.

11. The computer readable medium of claim 7, wherein each of the markers has a boundary line contrasting with the background color in the color palette.

12. The computer readable medium of claim 7, wherein moving a cursor over a marker in the group color mixer interface highlights the shape in the digital image corresponding to the marker.

13. A computer readable medium including code executable by a processor to implement an image editing tool comprising:
- a group color mixer interface for selecting colors for each of a plurality of shapes in a digital image, wherein the group color mixer interface comprises a plurality of markers, wherein each marker corresponds to one or more of the plurality of shapes so that each shape corresponds to a different one of the plurality of markers, and wherein each marker is adjustable over a color palette independently from other markers to select a color for its one or more corresponding shapes, the group color mixer including a marker generation module for generating the plurality of markers and for maintaining a map between the plurality of shapes and the plurality of markers; and
- a color pie comprising a plurality of color slices corresponding to the colors of the plurality of shapes in the digital image, wherein changing the color of a color slice changes the color of the corresponding shape in the digital image;
- wherein the color mixer interface and the color pie are distinct from the digital image.

14. The computer readable medium of claim 13, wherein said color slices are positioned in said color pie according to a continuous order of the shapes in the digital image.

15. The computer readable medium of claim 13, wherein the image editing tool is configured to:
- receive input to move a marker to a different color in the group color mixer interface to change the color of one or more shapes corresponding to the marker;
- receive input moving a color slice from outside the boundary of the color pie into the color pie;
- receive input removing a color slice, wherein said removing comprises dragging the color slice to a position outside of the color pie boundary; and
- swap colors between color slices in response to input dragging a color slice onto another color slice in the color pie.

16. A computer program product, encoded on a computer-readable medium, operable to cause data processing apparatus to perform operations for color-selective editing of a digital image on a display, said digital image comprising a plurality of shapes with color fills, said operations comprising:
- providing a group color mixer interface for selecting colors for each of a plurality of shapes in the digital image, wherein the group color mixer interface comprises a plurality of markers, wherein each marker corresponds to one or more of the plurality of shapes so that each shape corresponds to a different one of the plurality of markers, and wherein each marker is adjustable over a color palette independently from other markers to select a color for its one or more corresponding shapes;
- providing a color organizer interface comprising, a plurality of color element positions, wherein the plurality of color element positions comprises a set of positions each corresponding to a different one of the plurality of shapes in the digital image, wherein at least some of the plurality of color element positions are populated with a color element, wherein each color element is moveable to one of the color element positions of the set to change the color of the corresponding shape; and
- receiving input to the group color mixer interface and the color organizer interface, and updating the color of one or more of the shapes in the digital image in response to said input;
- wherein the color mixer interface and the color organizer interface are distinct from the digital image.

17. The computer program product of claim 16, wherein said receiving input comprises receiving input to move one of the markers to a different color in the group color mixer interface to change the color of one or more shapes corresponding to the marker.

18. The computer program product of claim 16,
- wherein the set of color element positions are in a first region of the color organizer interface and ones of the color element positions not in the set of positions are in a second region of the color organizer interface, wherein the color element positions in the second region do not correspond to any of the shapes;
- wherein said receiving input comprises receiving input dragging a color element from a color element position in the second region to an unpopulated color element position in the first region to set a color for the shape corresponding to the color element position in the first region;
- wherein said receiving input comprises receiving input dragging a color element from a color element position in the second region to a populated color element position in the first region, and swapping the color elements between the positions; and
- wherein said receiving input comprises receiving input dragging a color element from a color element position in the first region to an unpopulated color element position in the second region thereby unpopulating color element position in the first region.

19. The computer program product of claim 16, wherein the plurality of markers each has a boundary line contrasting with the background color in the color palette.

20. The computer program product of claim 16, wherein moving a cursor over a marker in the group color mixer interface highlights the shape in the digital image corresponding to the marker.

* * * * *

UNITED STATES PATENT AND TRADEMARK OFFICE
CERTIFICATE OF CORRECTION

| | | |
|---|---|---|
| PATENT NO. | : 7,701,464 B1 | Page 1 of 1 |
| APPLICATION NO. | : 11/683427 | |
| DATED | : April 20, 2010 | |
| INVENTOR(S) | : Anant Gilra | |

It is certified that error appears in the above-identified patent and that said Letters Patent is hereby corrected as shown below:

In the Claims:

Claim 7, col. 8, line 15, after "corresponding shape;" insert --and--.

Claim 9, col. 8, line 44, please delete "receiving" and insert --receive-- in place thereof.

Signed and Sealed this

Twenty-seventh Day of July, 2010

David J. Kappos
*Director of the United States Patent and Trademark Office*